United States Patent
Ouchi et al.

(10) Patent No.: US 11,486,996 B2
(45) Date of Patent: Nov. 1, 2022

(54) RADAR DEVICE AND ANTENNA DEVICE

(71) Applicant: Hitachi Automotive Systems, Ltd., Hitachinaka (JP)

(72) Inventors: Katsumi Ouchi, Hitachinaka (JP); Akira Kitayama, Hitachinaka (JP); Hiroshi Kuroda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 337 days.

(21) Appl. No.: 16/645,835

(22) PCT Filed: Sep. 14, 2018

(86) PCT No.: PCT/JP2018/034135
§ 371 (c)(1),
(2) Date: Mar. 10, 2020

(87) PCT Pub. No.: WO2019/059115
PCT Pub. Date: Mar. 28, 2019

(65) Prior Publication Data
US 2020/0200888 A1 Jun. 25, 2020

(30) Foreign Application Priority Data
Sep. 25, 2017 (JP) .............................. JP2017-184132

(51) Int. Cl.
*G01S 13/44* (2006.01)
*G01S 7/03* (2006.01)
(Continued)

(52) U.S. Cl.
CPC ................ *G01S 13/44* (2013.01); *G01S 7/03* (2013.01); *H01Q 19/08* (2013.01); *H01Q 21/06* (2013.01)

(58) Field of Classification Search
CPC .......... G01S 13/44; G01S 13/931; G01S 7/03; H01Q 19/08; H01Q 21/08
See application file for complete search history.

(56) References Cited

U.S. PATENT DOCUMENTS

| 6,452,536 | B1* | 9/2002 | Thomassen | G01S 7/023 |
| | | | | 342/368 |
| 6,847,328 | B1* | 1/2005 | Libonati | H01Q 9/0407 |
| | | | | 343/797 |

(Continued)

FOREIGN PATENT DOCUMENTS

| EP | 3 199 976 A1 | 8/2017 | |
| EP | 3199976 A1 * | 8/2017 | ........... G01S 13/931 |

(Continued)

OTHER PUBLICATIONS

International Search Report (PCT/ISA/210) issued in PCT Application No. PCT/JP2018/034135 dated Jan. 8, 2019 with English translation (five (5) pages).

(Continued)

*Primary Examiner* — Peter M Bythrow
(74) *Attorney, Agent, or Firm* — Crowell & Moring LLP

(57) ABSTRACT

The present invention minimizes the overall area occupied by a reception antenna while preventing erroneous detections resulting from azimuth aliasing. A reception antenna includes antenna elements that are disposed along the horizontal direction, antenna elements that are disposed along the vertical direction, and an antenna element that is disposed at an angle from the antenna elements with respect to the horizontal direction and is disposed at an angle from the antenna elements with respect to the vertical direction. The distance between the centers of the antenna elements in the horizontal direction differs from the distances between the center of the antenna element and the respective centers of the antenna elements in the horizontal direction. The distance between the centers of the antenna elements in the vertical direction differs from the distances between the center of the antenna element and the respective centers of the antenna elements in the vertical direction.

8 Claims, 11 Drawing Sheets

(51) Int. Cl.
*H01Q 19/08* (2006.01)
*H01Q 21/06* (2006.01)

(56) References Cited

U.S. PATENT DOCUMENTS

| | | | | |
|---|---|---|---|---|
| 7,026,990 | B2* | 4/2006 | Cooper | G01S 3/48 |
| | | | | 342/442 |
| 7,609,198 | B2* | 10/2009 | Chang | G01S 13/89 |
| | | | | 342/179 |
| 8,451,165 | B2* | 5/2013 | Puzella | G01S 7/032 |
| | | | | 342/13 |
| 9,739,881 | B1* | 8/2017 | Pavek | G01S 13/865 |
| 9,958,527 | B2* | 5/2018 | Tuxen | G01S 13/4454 |
| 10,141,636 | B2* | 11/2018 | Lee | H01Q 1/3283 |
| 2003/0151541 | A1* | 8/2003 | Oswald | G01S 13/46 |
| | | | | 342/72 |
| 2005/0024261 | A1* | 2/2005 | Fujita | G01S 7/4026 |
| | | | | 342/107 |
| 2007/0252748 | A1* | 11/2007 | Rees | H01Q 13/02 |
| | | | | 342/36 |
| 2007/0293331 | A1* | 12/2007 | Tuxen | G01S 13/88 |
| | | | | 473/199 |
| 2008/0048907 | A1* | 2/2008 | Matsuura | G01S 3/808 |
| | | | | 342/147 |
| 2010/0238068 | A1 | 9/2010 | Seidel et al. | |
| 2012/0050091 | A1* | 3/2012 | Inami | H01Q 21/061 |
| | | | | 342/107 |
| 2012/0119937 | A1* | 5/2012 | Yamada | G01S 7/4021 |
| | | | | 342/70 |
| 2012/0313811 | A1 | 12/2012 | Suzuki | |
| 2012/0319888 | A1 | 12/2012 | Suzuki | |
| 2015/0057833 | A1* | 2/2015 | Moriuchi | G01S 13/931 |
| | | | | 343/893 |
| 2015/0198697 | A1* | 7/2015 | Kishigami | G01S 7/2923 |
| | | | | 342/145 |
| 2015/0268328 | A1* | 9/2015 | Johnson | G01S 13/10 |
| | | | | 342/21 |
| 2015/0285898 | A1* | 10/2015 | Testar | G01V 8/005 |
| | | | | 342/175 |
| 2016/0093944 | A1* | 3/2016 | Kamo | H01Q 1/1271 |
| | | | | 348/148 |
| 2016/0104946 | A1 | 4/2016 | Natsume | |
| 2016/0282450 | A1* | 9/2016 | Kishigami | G01S 13/426 |
| 2016/0285172 | A1* | 9/2016 | Kishigami | G01S 7/023 |
| 2017/0082730 | A1* | 3/2017 | Kishigami | H01Q 21/061 |
| 2017/0187102 | A1* | 6/2017 | Abe | H01Q 1/3283 |
| 2018/0088224 | A1* | 3/2018 | Kishigami | H01Q 21/06 |
| 2018/0164430 | A1 | 6/2018 | Kuriyama et al. | |

FOREIGN PATENT DOCUMENTS

| | | |
|---|---|---|
| JP | 2008-83030 A | 4/2008 |
| JP | 2010-8319 A | 1/2010 |
| JP | 2010-175430 A | 8/2010 |
| JP | 2010-534327 A | 11/2010 |
| JP | 2014-219290 A | 11/2014 |
| JP | 2017-5429 A | 1/2017 |
| WO | WO 2011/092813 A1 | 8/2011 |
| WO | WO 2011/092814 A1 | 8/2011 |

OTHER PUBLICATIONS

Japanese-language Written Opinion (PCT/ISA/237) issued in PCT Application No. PCT/JP2018/034135 dated Jan. 8, 2019 (six (6) pages).

Japanese-language Office Action issued in Japanese Application No. 2019-543610 dated Mar. 2, 2021 with English translation (10 pages).

* cited by examiner

RADAR DEVICE AND ANTENNA DEVICE

TECHNICAL FIELD

The present invention relates to a radar device and an antenna device.

BACKGROUND ART

Conventionally, there is known a radar device that is mounted on an automobile and detects an object such as an obstacle around the vehicle so as to be used in automatic driving or a driving support system of the automobile. Such a radar device generally modulates radio waves in a frequency band with excellent linearity, such as a milliwave zone (77 GHz, 79 GHz) and a quasi-milliwave zone (24 GHz), by using a modulation method such as frequency modulated continuous wave (FMCW) modulation or multi-frequency CW modulation, and emits the modulated radio waves. Then, reflected waves of the emitted radio waves from a surrounding object are received and subjected to signal processing to calculate a relative distance, speed, and direction (angle) of the surrounding object with respect to the radar device.

A phase monopulse method may be employed in the radar device for the purpose of ensuring an antenna's gain or some other purpose, the method using an antenna configuration in which a plurality of reception antennas are disposed side by side at intervals of half a wavelength or more to obtain an azimuth of an object to be detected from the intervals of the reception antennas and the phase difference in received signals. In the phase monopulse method, erroneous detection (ghost) resulting from azimuth aliasing is a problem. In order to solve this problem, PTL 1 discloses a technique that eliminates ghost information caused by azimuth aliasing by performing signal processing with three or more reception antennas arranged at unequal intervals in a straight line.

CITATION LIST

Patent Literature

PTL 1: JP 2010-175430 A

SUMMARY OF INVENTION

Technical Problem

In the technique disclosed in PTL 1, since it is necessary to arrange three or more reception antennas on a straight line at unequal intervals, the overall area occupied by the reception antennas increases.

Solution to Problem

A radar device according to a first aspect of the present invention includes: a transmission antenna that transmits electromagnetic waves; a reception antenna that receives reflected waves from an object reflecting the electromagnetic waves; and a control unit. The reception antenna includes a first reception antenna element group made up of a plurality of first reception antenna elements that are disposed along a first direction, and a second reception antenna element that is disposed at an angle from at least two first reception antenna elements belonging to the first reception antenna element group with respect to the first direction. A distance between centers of the at least two first reception antenna elements in the first direction differs from distances between the respective centers of the at least two first reception antenna elements and a center of the second reception antenna element in the first direction. The control unit performs signal processing to calculate an angle of the object in the first direction by using received signals from the at least two first reception antenna elements and a received signal from the second reception antenna element.

A radar device according to a second aspect of the present invention includes: a transmission antenna that transmits electromagnetic waves; a reception antenna that receives reflected waves from an object reflecting the electromagnetic waves; and a control unit. The reception antenna includes a first reception antenna element group made up of a plurality of first reception antenna elements that are disposed along a first direction, a second reception antenna element group made up of a plurality of second reception antenna elements that are disposed along a second direction perpendicular to the first direction, and a third reception antenna element that is disposed at an angle from at least two first reception antenna elements belonging to the first reception antenna element group with respect to the first direction and is disposed at an angle from at least two second reception antenna elements belonging to the second reception antenna element group with respect to the second direction. A distance between centers of the at least two first reception antenna elements in the first direction differs from distances between the respective centers of the at least two first reception antenna elements and a center of the third reception antenna element in the first direction. A distance between centers of the at least two second reception antenna elements in the second direction differs from distances between the respective centers of the at least two second reception antenna elements and a center of the third reception antenna element in the second direction. The control unit performs signal processing to calculate an angle of the object in the first direction by using received signals from the at least two first reception antenna elements and a received signal from the third reception antenna element, and performs signal processing to calculate an angle of the object in the second direction by using received signals from the at least two second reception antenna elements and a received signal from the third reception antenna element.

An antenna device according to a third aspect of the present invention is used in a radar device and includes: a first antenna element group made up of a plurality of first antenna elements that are disposed along a first direction; and a second antenna element that is disposed at an angle from at least two first antenna elements belonging to the first antenna element group with respect to the first direction. A distance between centers of the at least two first antenna elements in the first direction differs from distances between the respective centers of the at least two first antenna elements and a center of the second antenna element in the first direction.

An antenna device according to a fourth aspect of the present invention is used in a radar device and includes: a first antenna element group made up of a plurality of first antenna elements that are disposed along a first direction; a second antenna element group made up of a plurality of second antenna elements that are disposed along a second direction perpendicular to the first direction; and a third antenna element that is disposed at an angle from at least two first antenna elements belonging to the first antenna element group with respect to the first direction and is disposed at an angle from at least two second antenna elements belonging to the second antenna element group with respect to the second direction. A distance between centers of the at least two first antenna elements in the first direction differs from distances between the respective centers of the at least two first antenna elements and a center of the third antenna element in the first direction. A distance between centers of the at least two second antenna elements in the second direction differs from distances between the respective centers of the at least two second antenna elements and a center of the third antenna element in the second direction.

Advantageous Effects of Invention

According to the present invention, it is possible to prevent erroneous detections resulting from azimuth aliasing while minimizing the overall area occupied by reception antennas.

DESCRIPTION OF EMBODIMENTS

Embodiments of the present invention will be described below with reference to the drawings.

First Embodiment

Figure 1:
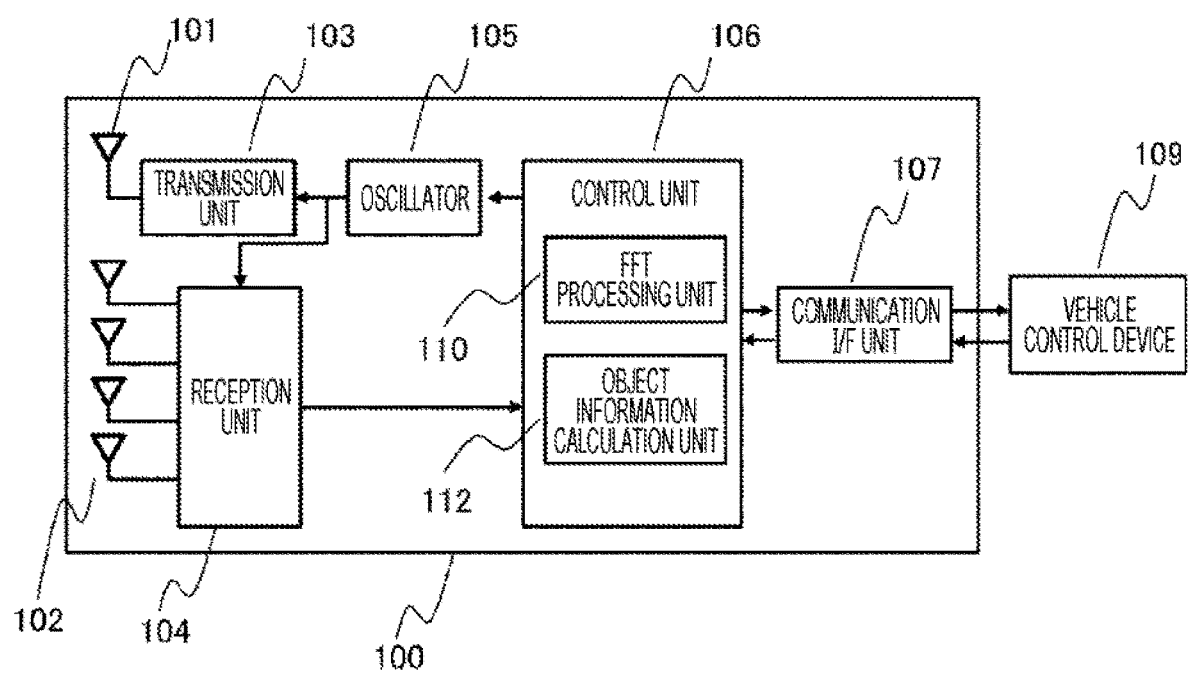
FIG. 1 is a diagram showing a configuration of a radar device according to an embodiment of the present invention.

FIG. 1 is a diagram showing a configuration of a radar device 100 according to an embodiment of the present invention. The radar device 100 is mounted on a vehicle such as an automobile and used to detect an object around the vehicle, and includes a transmission antenna 101, a reception antenna 102, a transmission unit 103, a reception unit 104, an oscillator 105, a control unit 106, and a communication interface (I/F) unit 107. The radar device 100 is connected to a vehicle control device 109 provided in the vehicle.

The oscillator 105 generates a frequency-modulated modulation signal and supplies the generated modulation signal to the transmission unit 103 and the reception unit 104. As the oscillator 105, for example, a phase locked loop (PLL) is used which is configured including a voltage controlled oscillator (VCO), a multiplier, or the like. A frequency of a modulation signal output by the oscillator 105, or a frequency obtained by dividing the frequency of the modulation signal by a predetermined ratio, is controlled (modulated) by the control unit 106.

The transmission unit 103 outputs a frequency-modulated transmission signal to the transmission antenna 101 by amplifying the modulation signal from the oscillator 105 with power when detecting the object around the vehicle. This transmission signal is emitted as radio waves directed around the vehicle, for example, forward of the vehicle, via the transmission antenna 101. Hereinafter, a period in which the frequency-modulated transmission signal is emitted from the transmission antenna 101 is referred to as a "modulation operation period."

When detecting the object around the vehicle, the reception unit 104 receives a signal obtained by reflection of a transmission signal, emitted from the transmission unit 103 via the transmission antenna 101 during the modulation operation period, on the object around the vehicle and input of the reflected signal into the reception antenna 102. Hereinafter, the signal received by the reception unit 104 in accordance with the transmission signal from the transmission unit 103 as thus described is referred to as a "received signal." Then, by mixing the received signal with the modulation signal from the oscillator 105, a beat signal corresponding to the frequency difference between these signals is generated, and frequency down-conversion is performed. The beat signal generated in the reception unit 104 is input into the control unit 106 after an unnecessary frequency is cut through a band limit filter (not shown).

When detecting the object around the vehicle, the control unit 106 causes the oscillator 105 to generate a modulation signal for the transmission unit 103 to emit a transmission signal during the modulation operation period. Then, digital data obtained by analog-to-digital (A/D) converting the beat signal from the reception unit 104 is input, and based on the digital data, signal processing for detecting the object around the vehicle is performed. Hereinafter, a period during which the control unit 106 performs such signal processing is referred to as a "signal processing period."

The control unit 106 includes, as its functions, an FFT processing unit 110 and an object information calculation unit 112. The control unit 106 is configured using, for example, a computer processing unit (CPU), a read-only memory (ROM), a random-access memory (RAM), and the like, and these functions are achieved by the CPU executing a program stored in the ROM. Note that each function of the control unit 106 may be achieved by hardware such as a field-programmable gate array (FPGA).

The FFT processing unit 110 receives the input of the digital data of the beat signal output from the reception unit 104 and A/D converted. The FFT processing unit 110 performs fast Fourier transform (FFT) based on the digital data of the input beat signal to obtain a signal waveform with the beat signal decomposed into frequency components. Information of the signal waveform obtained by the FFT processing unit 110, that is, spectrum information of the received signal, is output to the object information calculation unit 112.

The object information calculation unit 112 detects the object around the vehicle based on the spectrum information of the received signal output from the FFT processing unit 110, and calculates object information. Specifically, the frequency of the signal representing the object around the vehicle is identified from the spectrum information of the received signal, and angle estimation processing, tracking processing, and the like are performed to calculate object information representing the relative distance, speed, angle and the like of the object relative to the radar device 100. The object information calculated by the object information calculation unit 112 is transmitted to the vehicle control device 109 through the communication I/F unit 107.

In the radar device 100, a set of the modulation operation period and the signal processing period (hereinafter referred to as "frame") is repeated in regular cycles. Note that the modulation operation period and the signal processing period may be separate periods not overlapping each other in the same frame, or a part or the whole thereof may overlap.

The communication I/F unit 107 performs interface processing of communication signals input and output between the radar device 100 and the vehicle control device 109. By the interface processing performed by the communication I/F unit 107, the signal processing result of the control unit 106 is transmitted to the vehicle control device 109, and various control data transmitted from the vehicle control device 109 are input into the control unit 106.

Note that the configuration of the radar device 100 described in FIG. 1 is merely an example. The contents of the present invention are not limited to these configurations but can be applied to all radar devices having other configurations. For example, a plurality of transmission antennas 101 may be provided, and the FFT processing unit 110 may be achieved by hardware different from the control unit 106.

Next, by using FIG. 2 and FIG. 3, a description will be given of an example of the structure of the antenna elements constituting the transmission antenna 101 and the reception antenna 102 in the radar device 100 according to a first embodiment of the present invention. In the present embodiment, a description will be given of an example in which the transmission antenna 101 and the reception antenna 102 are each made up of a plurality of antenna elements 120 using horn antennas.

Figure 2:
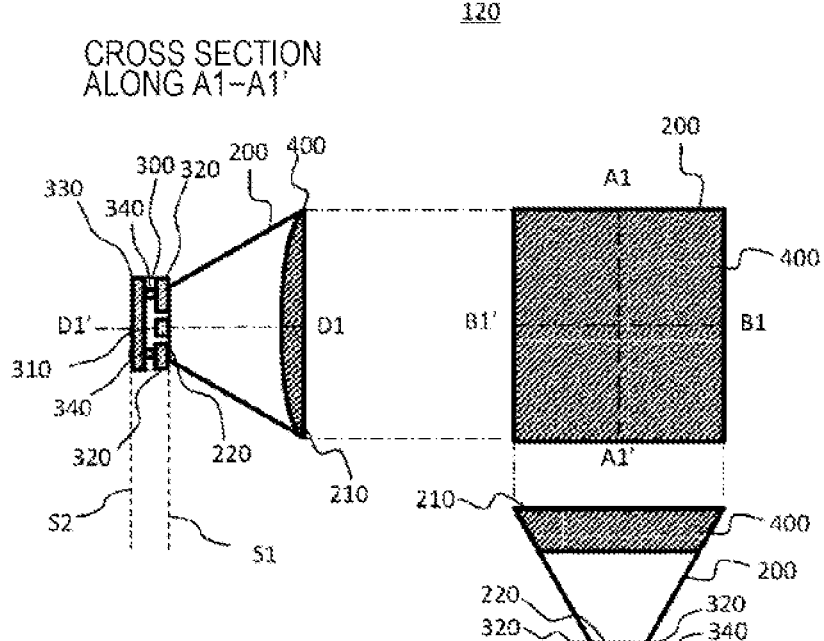
FIGS. 2A to 2C are structural views of an antenna element according to the embodiment of the present invention.

FIG. 2 is a structural view of the antenna element 120 according to the embodiment of the present invention. The antenna element 120 shown in FIG. 2 includes a horn section 200, a dielectric substrate 300, and a dielectric lens 400. The horn section 200 has an emission-side opening end 210 and an emission-source-side opening end 220. The dielectric substrate 300 is disposed at the emission-source-side opening end 220 of the horn section 200 and includes an emitting section 310, a first conductor section 320, a second conductor section 330, and a through-hole 340. The dielectric lens 400 is disposed at the emission-side opening end 210 of the horn section 200 and has an optical axis D1-D1'.

In FIG. 2, (A) shows a shape of the antenna element 120 viewed from the direction of the emission-side opening end 210 of the horn section 200. (B) shows a cross-sectional shape of the antenna element 120 cut along a first imaginary line A1-A1' shown in (A), and (C) shows a cross-sectional shape of the antenna element 120 cut along a second imaginary line B1-B1' shown in (A). The first imaginary line A1-A1' is a longitudinal center line passing through the center of the emission-side opening end 210 of the horn section 200 in the longitudinal direction. The second imaginary line B1-B1' is a lateral center line passing through the center of the emission-side opening end 210 of the horn section 200 in the lateral direction and is orthogonal to the first imaginary line A1-A1'. The optical axis D1-D1' of the dielectric lens 400 passes through an intersection of the first imaginary line A1-A1' and the second imaginary line B1-B1'.

In the case of the antenna element 120 used for the transmission antenna 101, the emitting section 310 converts the transmission signal input from the transmission unit 103 into electromagnetic waves and emits the converted electromagnetic waves toward the emission-source-side opening end 220 of the horn section 200. The horn section 200 propagates the electromagnetic waves emitted from the emitting section 310 from the emission-source-side opening end 220 to the emission-side opening end 210. The dielectric lens 400 converts the electromagnetic waves emitted from the emitting section 310 into plane waves and emits the converted electromagnetic waves. Thereby, the antenna element 120 emits radio waves substantially parallel to the optical axis D1-D1' of the dielectric lens 400 toward the object around the vehicle.

On the other hand, in the case of the antenna element 120 used for the reception antenna 102, the dielectric lens 400 collects the reflected waves, reflected from the object and incident on the emission-side opening end 210 of the horn section 200, toward the emission-source-side opening end 220. The horn section 200 propagates the reflected waves collected by the dielectric lens 400 from the emission-side opening end 210 to the emission-source-side opening end 220. The emitting section 310 converts the reflected waves collected by the dielectric lens 400 into a received signal and outputs the converted received signal to the reception unit 104.

The emitting section 310 is formed on a first surface S1 where the dielectric substrate 300 is in contact with the horn section 200, and the emitting section 310 is disposed at the approximate center of the emission-source-side opening end 220. The first conductor section 320 is formed on the same first surface S1 as the emitting section 310 and is disposed around the emitting section 310 so as to be in contact with the horn section 200. The second conductor section 330 is formed on a second surface S2 of the dielectric substrate 300 opposite to the first surface S1 where the emitting section 310 and the first conductor section 320 are formed. The through-hole 340 is formed inside the dielectric substrate 300 so that the first conductor section 320 and the second conductor section 330 are connected electrically.

In the antenna element 120 of the present embodiment, the first imaginary line A1-A1' is longer than the second imaginary line B1-B1'. That is, in the antenna element 120 of the present embodiment, the emission-side opening end 210 of the horn section 200 is longer in the direction of the first imaginary line A1-A1' (longitudinal direction) than in the direction of the second imaginary line B1-B1' (lateral direction), and has a rectangular shape. However, the shape of the antenna element 120 is not limited thereto.

Figure 3:
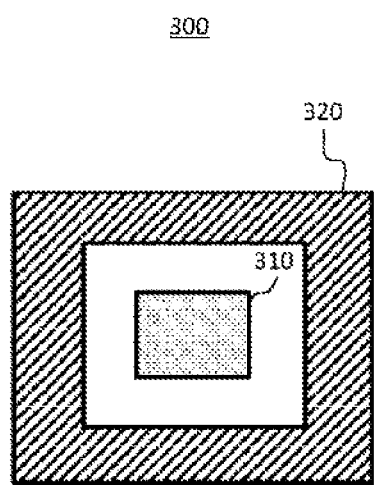
FIG. 3 is a view showing a dielectric substrate according to the embodiment of the present invention.

FIG. 3 is a diagram showing a dielectric substrate 300 according to the embodiment of the present invention. FIG. 3 shows the shape of the dielectric substrate 300 viewed from the first surface S1 side. As shown in FIG. 3, on the first surface S1 of the dielectric substrate 300, the first conductor section 320 is formed so as to surround the emitting section 310 at a certain distance from the emitting section 310.

As shown in FIG. 2, the first conductor section 320 is electrically connected to the second conductor section 330 formed on the second surface S2 of the dielectric substrate 300 via the through-hole 340. Thereby, the first conductor section 320 and the second conductor section 330 function as a reference potential surface of the emitting section 310. The emitting section 310 operates as a patch antenna and emits electromagnetic waves from the first surface S1 side of the dielectric substrate 300.

Figure 4:
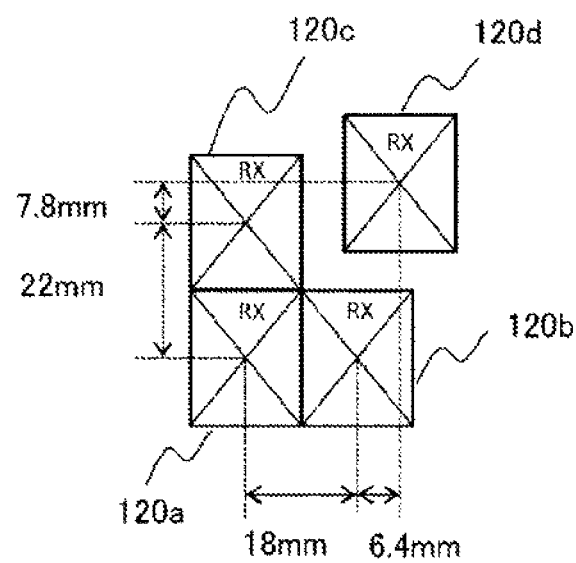
FIG. 4 is a view showing an arrangement of antenna elements in a reception antenna according to a first embodiment of the present invention.

Next, an arrangement example of the antenna elements in the reception antenna 102 will be described. FIG. 4 is a diagram showing the arrangement of the antenna elements in the reception antenna 102 according to the first embodiment of the present invention. FIG. 4 shows a state in which the reception antenna 102 with four antenna elements 120a to 120d arranged therein is viewed from the reception surface (radar front) side in the radar device 100 having four reception channels. Note that the antenna elements 120a to 120d have the same structure as the antenna element 120 described with reference to FIGS. 2 and 3. That is, the antenna elements 120a to 120d are each made up of the horn section 200, the dielectric substrate 300, and the dielectric lens 400 shown in FIGS. 2 and 3.

As shown in FIG. 4, the antenna elements 120a and 120b are disposed adjacent to each other in the horizontal direction. The antenna elements is 120a and 120c are disposed adjacent to each other in the perpendicular direction. For example, it is assumed that the size of the horn section 200 included in each of the antenna elements 120a to 120d is 18 mm in the horizontal direction and 22 mm in the perpendicular direction. At this time, as shown in FIG. 4, the distance between the centers of the antenna element 120a and the antenna element 120b in the horizontal direction is 18 mm, and, the distance between the centers of the antenna element 120a and the antenna element 120c in the perpendicular direction is 22 mm. Thereby, the position of the object in two directions orthogonal to each other, that is, in the horizontal direction and the perpendicular direction, can be detected.

On the other hand, the antenna element 120d is disposed at a position shifted at an angle from the antenna elements 120a to 120c. That is, when viewed from the antenna elements 120a and 120b, the antenna element 120d is disposed at an angle from these antenna elements with respect to the arrangement direction thereof, that is, the horizontal direction. Thus, the distance between the centers of the antenna elements 120a and 120b in the horizontal direction differs from distances between the respective centers of these and the center of the antenna element 120d in the horizontal direction. Specifically, for example, as shown in FIG. 4, the distance between the centers of the antenna element 120b and the antenna element 120d in the horizontal direction is 6.4 mm. At this time, the distance between the centers of the antenna element 120a and the antenna element 120d in the horizontal direction is 18+6.4=24.4 mm.

Similarly, when viewed from the antenna elements 120a and 120c, the antenna element 120d is disposed at an angle from these antenna elements with respect to the arrangement direction thereof, that is, the perpendicular direction. Thus, the distance between the centers of the antenna elements 120a and 120c in the perpendicular direction differs from distances between the respective centers of these and the center of the antenna element 120d in the perpendicular direction. Specifically, for example, as shown in FIG. 4, the distance between the centers of the antenna element 120c and the antenna element 120d in the perpendicular direction is 7.8 mm. At this time, the distance between the centers of the antenna element 120a and the antenna element 120d in the perpendicular direction is 22+7.8=29.8 mm.

Note that each of the distances among the centers of the antenna elements 120a to 120d described above is an example, and it is not always necessary to use these numerical values. The distances among the centers of the antenna elements 120a to 120d are determined so that the direction of the object can be uniquely determined from the received signals obtained by respectively receiving the reflected signals in the antenna elements 120a to 120d. Specifically, at a horizontal viewing angle (e.g., ±45 degrees) of the radar device 100, the distances among the centers of the antenna elements 120a, 120b, and 120d in the horizontal direction are determined so that one horizontal angle is determined from the combination of the phase difference between the received signal of the antenna element 120a and the received signal of the antenna element 120b and the phase difference between the received signal of the antenna element 120b and the received signal of the antenna element 120d. Further, at a perpendicular viewing angle (e.g., ±45 degrees) of the radar device 100, the distances among the centers of the antenna elements 120a, 120c, and 120d in the perpendicular direction are determined so that one perpendicular angle is determined from the combination of the phase difference between the received signal of the antenna element 120a and the received signal of the antenna element 120c and the phase difference between the received signal of the antenna element 120c and the received signal of the antenna element 120d.

A method for determining the distances among the centers of the antenna elements 120a to 120d will be described below with reference to FIGS. 5 and 6. In the following description, the received signals output from the antenna elements 120a to 120d are referred to as reception channels Ca to Cd, respectively. Further, the phase difference between the reception channel Ca and the reception channel Cb is referred to as a "first phase difference," the phase difference between the reception channel Cb and the reception channel Cd is referred to as a "second phase difference," the phase difference between the reception channel Ca and the reception channel Cc is referred to as a "third phase difference," and the phase difference between the reception channel Cc and the reception channel Cd is referred to as a "fourth phase difference."

Figure 5:
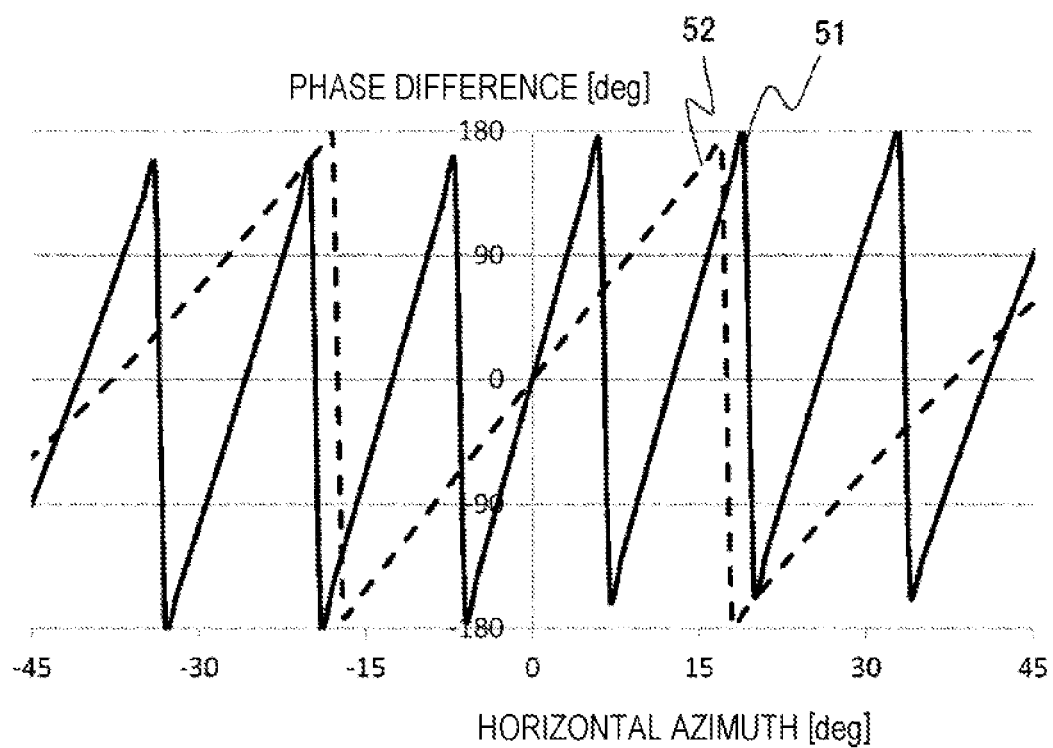
FIG. 5 is a diagram showing an example of a phase difference between two pairs of reception antennas having different horizontal intervals.

FIG. 5 is a diagram showing an example of the phase difference between two pairs of reception antennas having different horizontal intervals. FIG. 5 shows the relationship between the horizontal azimuth of an object and the phase difference when reflected waves having a frequency of about 77 GHz are received from the object in the arrangement of the antenna elements shown in FIG. 4. In FIG. 5, the lateral axis represents the horizontal azimuth of the object when the radar front direction is ±0 degrees, that is, the horizontal angle of the object, and the longitudinal axis represents the magnitude of the phase difference between the antenna elements.

A graph 51 indicated by a solid line in FIG. 5 is a graph indicating the first phase difference. A graph 52 indicated by a broken line in FIG. 5 is a graph indicating the second phase difference. The respective vertex positions and inclinations of these graphs 51 and 52 are determined in accordance with the distances among the centers of the antenna elements 120a, 120b, and 120d in the horizontal direction. Therefore, in the reception antennas 102 of the present embodiment, the distances among the centers of the antenna elements 120a, 120b, and 120d in the horizontal direction are determined so that one horizontal azimuth is determined in the graphs 51 and 52 for any value of the first phase difference and the second phase difference.

Figure 6:
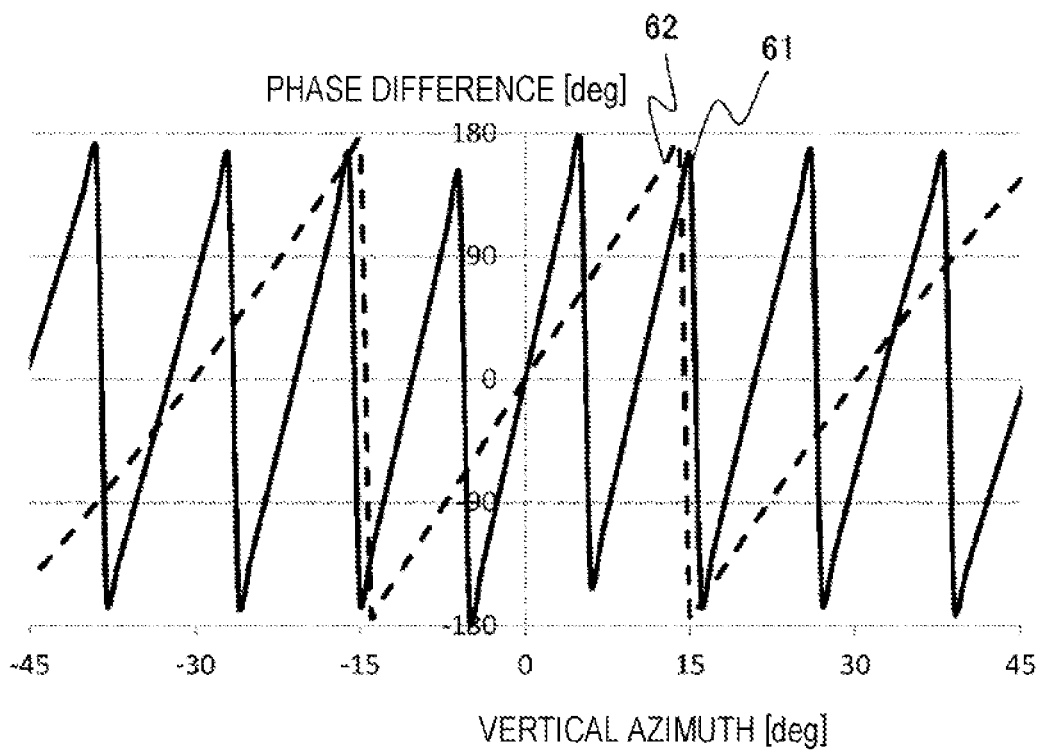
FIG. 6 is a diagram showing an example of a phase difference between two pairs of reception antennas having different vertical intervals.

FIG. 6 is a diagram showing an example of the phase difference between two pairs of reception antennas having different vertical intervals. FIG. 6 shows the relationship between the vertical azimuth of an object and the phase difference when reflected waves having a frequency of about 77 GHz are received from the object in the arrangement of the antenna elements shown in FIG. 4. In FIG. 6, the lateral axis represents the vertical azimuth of the object when the radar front direction is ±0 degrees, that is, the perpendicular angle of the object, and the longitudinal axis represents the magnitude of the phase difference between the antenna elements.

A graph 61 indicated by a solid line in FIG. 6 is a graph indicating the third phase difference. A graph 62 indicated by a broken line in FIG. 6 is a graph showing the fourth phase difference. The respective vertex positions and inclinations of these graphs 61 and 62 are determined in accordance with the distances among the centers of the antenna elements 120a, 120c, and 120d in the perpendicular direction. Therefore, in the reception antennas 102 of the present embodiment, the distances among the centers of the antenna elements 120a, 120c, and 120d in the perpendicular direction are determined so that one vertical azimuth is determined in the graphs 61 and 62 for any value of the third phase difference and the fourth phase difference.

Figure 7:
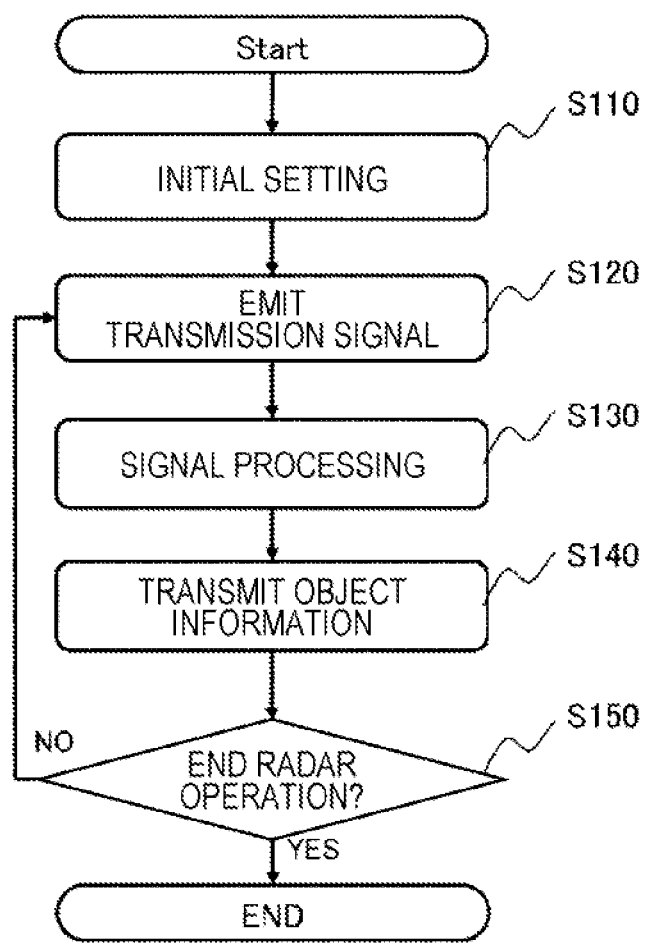
FIG. 7 is a diagram showing an operation flow of a radar device according to the embodiment of the present invention.

Next, details of processing performed by the control unit 106 in the present embodiment will be described. FIG. 7 is a diagram showing an operation flow of the radar device 100 according to the embodiment of the present invention. The control unit 106 implements the processing shown in the flowchart of FIG. 7 by a program executed by the CPU, for example.

In step S110, the control unit 106 performs initial settings of various parameters in the radar device 100. Here, the oscillator 105 sets initial values of a modulation setting parameter for a modulation signal generated during the modulation operation period, a signal processing setting parameter for the signal processing to be executed by the control unit 106 during the signal processing period, and the like. As the initial values of these parameters, those stored in advance in the radar device 100 may be used, or values used immediately before may be used.

In step S120, the control unit 106 controls the oscillator 105 and the transmission unit 103 so as to emit a frequency-modulated transmission signal from transmission antenna 101 toward the periphery of the vehicle. At this time, the control unit 106 controls the frequency of the modulation signal generated by the oscillator 105, by using the modulation setting parameter initially set in step S110, and determines the frequency band of the transmission signal.

In step S130, the control unit 106 performs signal processing for detecting the object around the vehicle by using the digital data of the beat signal that has been output from the reception unit 104 in accordance with the received signal obtained by reflection of the transmission signal, emitted in step S120, on the object around the vehicle. Here, by performing signal processing in accordance with a flowchart of FIG. 8 described later, the object around the vehicle is detected from the received signal, and the relative distance, speed, angle, and the like of the object are calculated as object information.

In step S140, the control unit 106 transmits the object information calculated in step S130 to the vehicle control device 109 via the communication I/F unit 107.

In step S150, the control unit 106 determines whether or not a preset operation end condition of the radar device 100 is satisfied. When the operation end condition of the radar device 100 is not satisfied, the control unit 106 returns to step S120 and repeats the above processing. On the other hand, when the operation end condition of the radar device 100 is satisfied, the control unit 106 ends the processing shown in the flowchart of FIG. 7 and stops.

Figure 8:
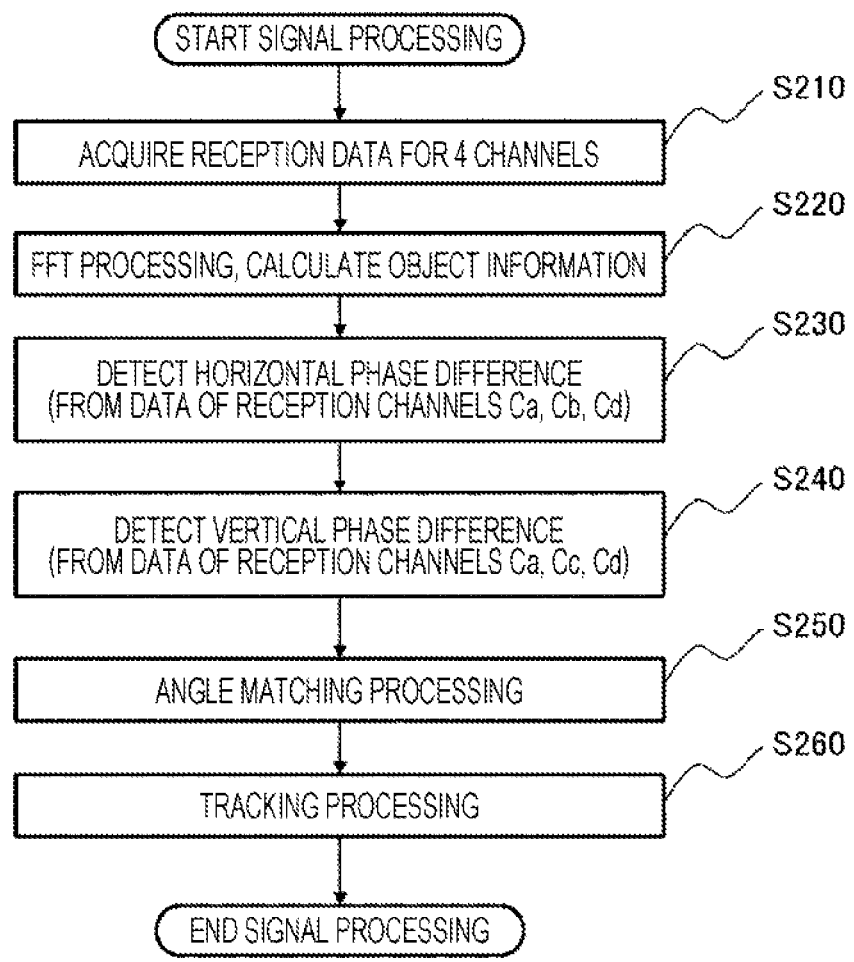
FIG. 8 is a diagram showing a flow of signal processing according to the first embodiment of the present invention.

Next, details of the signal processing performed by the control unit 106 in step S130 of FIG. 7 in the present embodiment will be described. FIG. 8 is a diagram showing the flow of the signal processing according to the first embodiment of the present invention. In the present embodiment, the control unit 106 performs the signal processing in step S130 in accordance with the flowchart of FIG. 8.

In step S210, the control unit 106 acquires a received signal for each of the four channels output from the reception antenna 102, that is, received data of each of the reception channels Ca to Cd. Here, digital data of each of beat signals of the reception channels Ca to Cd output from the reception unit 104 is acquired as received data for each of the four channels corresponding to the reception channels Ca to Cd.

In step S220, first, the control unit 106 performs the FFT processing on the received data for each of the four channels acquired in step S210 in the FFT processing unit 110, thereby acquiring the frequency spectrum information of each of the reception channels Ca to Cd. Subsequently, in the object information calculation unit 112, the object around the vehicle is detected from the frequency spectrum information of each of the reception channels Ca to Cd by using the signal processing setting parameter initially set in step S110, and the relative distance and speed of the object are calculated as object information.

In step S230, the control unit 106 uses the received data for each of three channels from three antenna elements, arranged with the distances among the centers thereof different in the horizontal direction, out of the received data for each of the four channels acquired in step S210, to detect the horizontal phase difference between the received signals. Here, by using the received data of each of the reception channels Ca, Cb, and Cd that are received signals output from the antenna elements 120a, 120b, and 120d, respectively, the phase differences among these received signals are detected. Specifically, the first phase difference is calculated by the phase monopulse method based on the distance between the centers of the antenna elements 120a and 120b in the horizontal direction illustrated in FIG. 4 and the received data of each of the reception channels Ca and Cb. Similarly, the second phase difference is calculated by the phase monopulse method based on the distance between the centers of the antenna elements 120b and 120d in the horizontal direction illustrated in FIG. 4 and the received data of each of the reception channels Cb and Cd.

In step S240, the control unit 106 uses the received data for each of the three channels from the three antenna elements, arranged with the distances among the centers thereof different in the perpendicular direction, out of the received data for each of the four channels acquired in step S210, to detect the vertical phase difference between the received signals. Here, by using the received data of each of the reception channels Ca, Cc, and Cd that are received signals output from the antenna elements 120a and 120c, and 120d, respectively, the phase differences among these received signals are detected. Specifically, the third phase difference is calculated by the phase monopulse method based on the distance between the centers of the antenna elements 120a and 120c in the perpendicular direction illustrated in FIG. 4 and the received data of each of the reception channels Ca and Cc. Similarly, the fourth phase difference is calculated by the phase monopulse method based on the distance between the centers of the antenna elements 120c and 120d in the perpendicular direction illustrated in FIG. 4 and the received data of each of the reception channels Cc and Cd.

In step S250, the control unit 106 performs angle matching processing using the phase differences detected in steps S230 and S240, respectively. Specifically, the horizontal angle of the object is determined based on the combination of the first phase difference and the second phase difference calculated in step S230 and the relationship of these illustrated in FIG. 5. Further, the perpendicular angle of the object is determined based on the combination of the third phase difference and the fourth phase difference calculated in step S240 and the relationship of these illustrated in FIG. 6. Thereby, the relative angle of the object is calculated as object information.

In step S260, the control unit 106 performs object tracking processing from the history of the object information calculated in each of steps S220 and S250. After performing step S260, the control unit 106 ends the signal processing shown in FIG. 8.

According to the first embodiment of the present invention described above, the following function effects are obtained.

(1) The radar device 100 includes: the transmission antenna 101 that transmits electromagnetic waves; the reception antenna 102 that receives reflected waves from an object reflecting electromagnetic waves; and the control unit 106. The reception antenna 102 includes the antenna elements 120a and 120b that are disposed along the horizontal direction, the antenna elements 120a and 120c that are disposed along the vertical direction, and the antenna element 120d that is disposed at an angle from the antenna elements 120a and 120b with respect to the horizontal direction and is disposed at an angle from the antenna elements 120a and 120c with respect to the perpendicular direction. The distance between the centers of the antenna elements 120a and 120b in the horizontal direction differs from the distances between the respective centers of the antenna elements 120a and 120c and the center of the antenna element 120d in the horizontal direction. The distance between the centers of the antenna elements 120a and 120c in the perpendicular direction differs from the distances between the respective centers of the antenna elements 120a and 120c and the center of the antenna element 120d in the perpendicular direction. The control unit 106 performs signal processing for calculating the horizontal angle of the object by using the received signals from the antenna elements 120a and 120b and the received signal from the antenna element 120d (steps S230 and S250), and performs signal processing for calculating a perpendicular angle of the object by using the received signals from the antenna elements 120a and 120c and the received signal from the antenna element 120d (steps S240 and S250). In this manner, it is possible to prevent erroneous detection caused by azimuth aliasing in the horizontal direction and the perpendicular direction while minimizing the overall area occupied by the reception antennas 102. Further, it is possible to reduce the amount of received data necessary for the signal processing.

(2) The antenna element 120a of the two antenna elements 120a and 120b that are disposed along the horizontal direction and the antenna element 120a of the two antenna elements 120a and 120c that are disposed along the perpendicular direction overlap each other. In this manner, it is possible to reduce the manufacturing cost of the reception antennas 102 while further minimizing the overall area occupied by the reception antennas 102.

(3) The direction in which the antenna elements 120a and 120b are disposed is the horizontal direction, and the vertical direction, which is a direction perpendicular to the horizontal direction, is the direction in which the antenna elements 120a and 120c are disposed. In this manner, it is possible to calculate object information suitable for the use in the automatic driving or the driving support system of the automobile.

(4) Each of the antenna elements 120a to 120d in the reception antenna 102 includes: the horn section 200; the dielectric lens 400 that is disposed at the emission-side opening end 210 which is one opening end of the horn section 200, and collects the reflected waves from the object; and the emitting section 310 that is disposed at the emission-source-side opening end 220 which is the other opening end of the horn section 200 and converts the reflected waves, collected by the dielectric lens 400, into an electric signal. In this manner, it is possible to configure a small and high-gain reception antenna 102 suitable for the use in the radar device 100.

Second Embodiment

Next, a second embodiment of the present invention will be described. In the present embodiment, a description will be given of an example in which signal processing is performed with a reception antenna configuration different from that described in the first embodiment. Note that the configuration of the radar device 100, the functional configuration of the control unit 106, the overall processing flow of the control unit 106 described in FIG. 7, and the like in the present embodiment are the same as those in the first embodiment, so that in the following, the descriptions of these will be omitted, but only the differences in the reception antenna configuration and the signal processing will be described.

Figure 9:
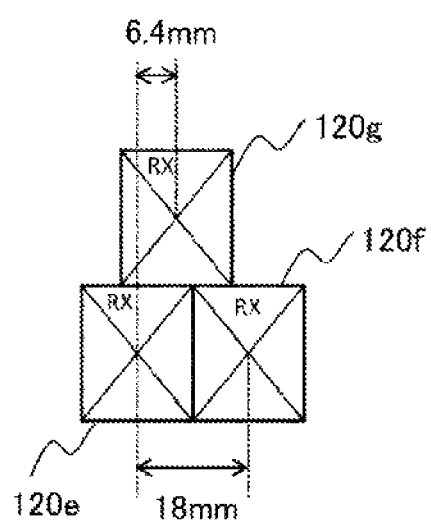
FIG. 9 is a view showing an arrangement of antenna elements in a reception antenna according to a second embodiment of the present invention.

FIG. 9 is a view showing an arrangement of antenna elements in the reception antenna 102 according to the second embodiment of the present invention. FIG. 9 shows a state in which the reception antenna 102 with three antenna elements 120e to 120g arranged therein is viewed from the reception surface (radar front) side in the radar device 100 having three reception channels. Note that the antenna elements 120e to 120g of the present embodiment also have the same structure as the antenna element 120 described with reference to FIGS. 2 and 3, similarly to the antenna elements 120a to 120d according to the first embodiment. That is, the antenna elements 120e to 120g are each made up of the horn section 200, the dielectric substrate 300, and the dielectric lens 400 shown in FIGS. 2 and 3.

As shown in FIG. 9, the antenna elements 120e and 120f are disposed adjacent to each other in the horizontal direction. For example, it is assumed that the size of the horn section 200 included in each of the antenna elements 120e and 120f is 18 mm in the horizontal direction and 22 mm in the perpendicular direction, similarly to the antenna elements 120a to 120d of the first embodiment. At this time, as shown in FIG. 9, the distance between the centers of the antenna element 120e and the antenna element 120f in the horizontal direction is 18 mm.

On the other hand, the antenna element 120g is disposed at a position shifted at an angle from the antenna elements 120e and 120f. That is, when viewed from the antenna elements 120e and 120f, the antenna element 120g is disposed at an angle from these antenna elements with respect to the arrangement direction thereof, that is, the horizontal direction. Thus, the distance between the centers of the antenna elements 120e and 120f in the horizontal direction differs from distances between the respective centers of these and the center of the antenna element 120g in the horizontal direction. Specifically, for example, as shown in FIG. 9, the distance between the centers of the antenna element 120e and the antenna element 120g in the horizontal direction is 6.4 mm. At this time, the distance between the centers of the antenna element 120f and the antenna element 120g in the horizontal direction is 18−6.4=11.6 mm.

Note that each of the distances among the centers of the antenna elements 120e to 120g described above is an example, and it is not always necessary to use these numerical values. The distances among the centers of the antenna elements 120e to 120g are determined so that the direction of the object can be uniquely determined from the received signals obtained by respectively receiving the reflected signals in the antenna elements 120e to 120g. Specifically, at a horizontal viewing angle (e.g., ±45 degrees) of the radar device 100, the distances among the centers of the antenna elements 120e, 120f, and 120g in the horizontal direction are determined so that one horizontal angle is determined from the combination of the phase difference between the received signal of the antenna element 120e and the received signal of the antenna element 120f and the phase difference between the received signal of the antenna element 120e and the received signal of the antenna element 120g.

A method for determining the distances among the centers of the antenna elements 120e to 120g is as described with reference to FIG. 5 in the first embodiment. That is, the distances among the centers of the antenna elements 120e to 120g in the horizontal direction are determined so that one horizontal azimuth is determined for any value of the phase difference between a reception channel Ce and a reception channel Cf (hereinafter referred to as a fifth phase difference) and the phase difference between the reception channel Ce and a reception channel Cg (hereinafter referred to as a sixth phase difference). Note that the reception channels Ce to Cg are received signals output from the antenna elements 120e to 120g, respectively.

Figure 10:
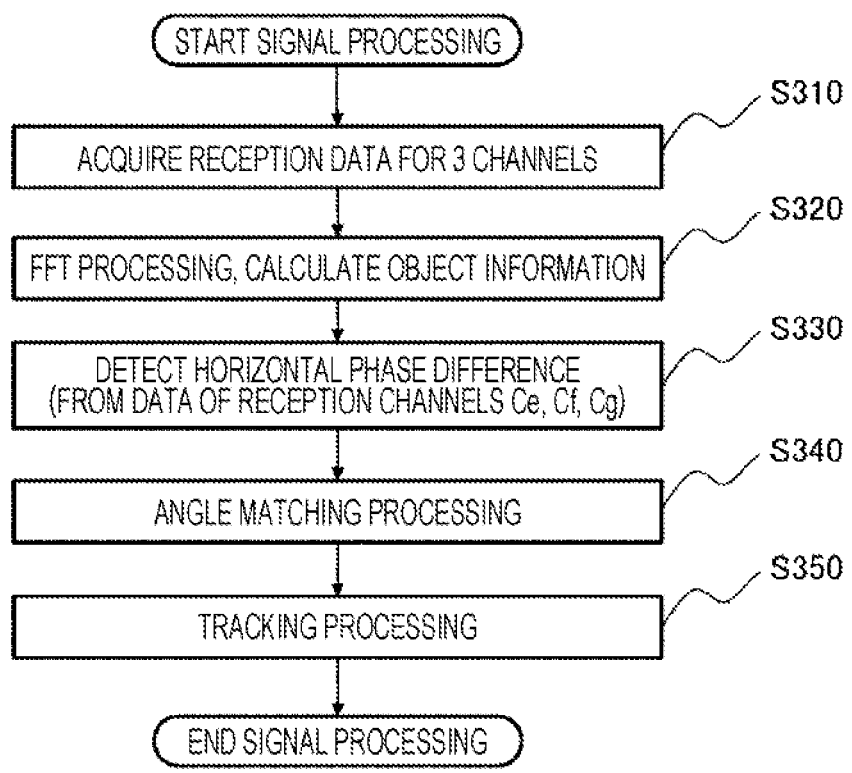
FIG. 10 is a diagram showing a flow of signal processing according to the second embodiment of the present invention.

Next, details of the signal processing performed by the control unit 106 in step S130 of FIG. 7 in the present embodiment will be described. FIG. 10 is a diagram showing the flow of the signal processing according to the second embodiment of the present invention. In the present embodiment, the control unit 106 performs the signal processing in step S130 in accordance with the flowchart of FIG. 10.

In step S310, the control unit 106 acquires a received signal for each of the three channels output from the reception antenna 102, that is, received data of each of the reception channels Ce to Cg. Here, digital data of each of beat signals of the reception channels Ce to Cg output from the reception unit 104 is acquired as received data for each of the three channels corresponding to the reception channels Ce to Cg.

In step S320, the control unit 106 performs the same processing as step S220 of FIG. 8 described in the first embodiment, using the received data for each of the three channels acquired in step S310. Thus, the object around the vehicle is detected, and the relative distance and speed of the object are calculated as object information.

In step S330, the control unit 106 detects a horizontal phase difference in the received signal using the received data for each of the three channels acquired in step S310. Here, by using the received data of each of the reception channels Ce, Cf, and Cg that are received signals output from the antenna elements 120e, 120f, and 120g, respectively, the phase differences among these received signals are detected. Specifically, the fifth phase difference is calculated by the phase monopulse method based on the distance between the centers of the antenna elements 120e and 120f in the horizontal direction illustrated in FIG. 9 and the received data of each of the reception channels Ce and Cf. Similarly, the sixth phase difference is calculated by the phase monopulse method based on the distance between the centers of the antenna elements 120e and 120g in the horizontal direction illustrated in FIG. 9 and the received data of each of the reception channels Ce and Cg.

In step S340, the control unit 106 performs angle matching processing using the phase difference detected in steps S230. Note that, in step S340 of the present embodiment, only the angle matching processing with respect to the horizontal direction is performed, differently from step S250 of FIG. 8 in the first embodiment. Specifically, the horizontal angle of the object is determined based on the combination of the fifth phase difference and the sixth phase difference calculated in step S330 and the relationship of these which is known. Thereby, the relative angle of the object is calculated as object information.

In step S350, the control unit 106 performs object tracking processing from the history of the object information calculated in each of steps S320 and S340. After executing step S350, the control unit 106 ends the signal processing shown in FIG. 10.

According to the second embodiment of the present invention described above, the following function effects are obtained.

(1) The radar device 100 includes: the transmission antenna 101 that transmits electromagnetic waves; the reception antenna 102 that receives reflected waves from an object reflecting electromagnetic waves; and the control unit 106. The reception antenna 102 includes the antenna elements 120e and 120f that are disposed along the horizontal direction, and the antenna element 120g that is disposed at an angle from the antenna elements 120e and 120f with respect to the horizontal direction. The distance between the centers of the antenna elements 120e and 120f in the horizontal direction differs from the distances between the respective centers of the antenna elements 120e and 120f and the center of the antenna element 120g in the horizontal direction. The control unit 106 performs signal processing for calculating the horizontal angle of the object by using the received signals from the antenna elements 120e and 120f and the received signal from the antenna element 120g (steps S330 and S340). In this manner, it is possible to prevent erroneous detection caused by azimuth aliasing in the horizontal direction while minimizing the overall area occupied by the reception antennas 102.

(2) The direction in which the antenna elements 120e and 120f are disposed is the horizontal direction. In this manner, it is possible to calculate object information suitable for the use in the automatic driving or the driving support system of the automobile.

(3) Similarly to the antenna elements 120a to 120d in the first embodiment, each of the antenna elements 120e to 120g in the reception antenna 102 includes: the horn section 200; the dielectric lens 400 that is disposed at the emission-side opening end 210 being one opening end of the horn section 200 and collects the reflected waves from the object; and the emitting section 310 that is disposed at the emission-source-side opening end 220 being the other opening end of the horn section 200 and converts the reflected waves, collected by the dielectric lens 400, into an electric signal. In this manner, it is possible to configure a small and high-gain reception antenna 102 suitable for the use in the radar device 100.

Third Embodiment

Next, a third embodiment of the present invention will be described. In the present embodiment, a description will be given of an example in which the reception antenna configuration described in the second embodiment is expanded to achieve not only the countermeasures against the horizontal azimuth aliasing but also high angular resolution. Note that the configuration of the radar device 100, the functional configuration of the control unit 106, the overall processing flow of the control unit 106 described in FIG. 7, and the like in the present embodiment are the same as those in the first and second embodiments, so that in the following, the descriptions of these will be omitted, but only the difference in the antenna configuration will be described.

Figure 11:
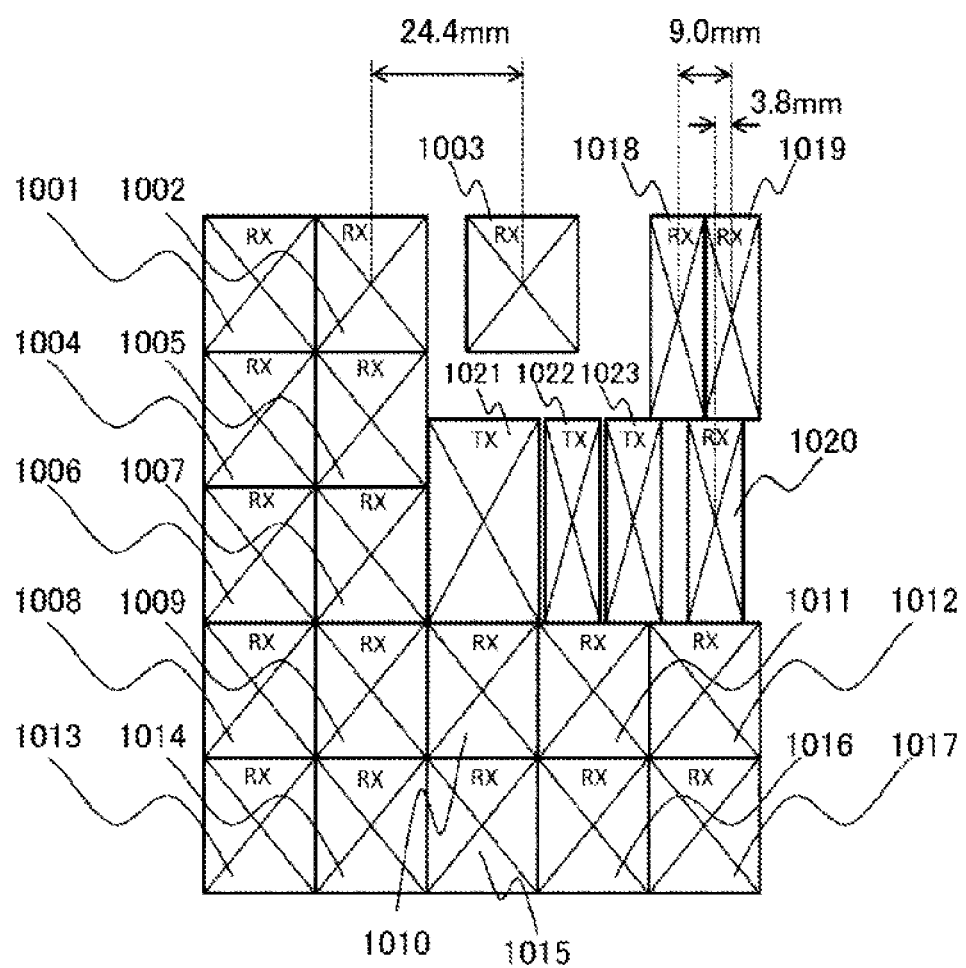
FIG. 11 is a view showing an arrangement of antenna elements in a reception antenna according to a third embodiment of the present invention.

FIG. 11 is a diagram showing an arrangement of antenna elements in the transmission antenna 101 and the reception antenna 102 according to the third embodiment of the present invention. FIG. 11 shows a state in which the reception antenna 102 in which antenna elements 1001 to 1020 are arranged and the transmission antenna 101 in which antenna elements 1021 to 1023 are arranged are viewed from the transmission/reception surface (radar front) side. Note that the antenna elements 1001 to 1023 of the present embodiment also have the same structure as the antenna element 120 described with reference to FIGS. 2 and 3, similarly to the antenna elements 120a to 120d according to the first embodiment. That is, the antenna elements 1001 to 1023 are each made up of the horn section 200, the dielectric substrate 300, and the dielectric lens 400 shown in FIGS. 2 and 3.

The antenna elements 1001 to 1017 are long-distance reception antenna elements. For example, it is assumed that the size of the horn section 200 included in each of the antenna elements 1001 to 1017 is 18 mm in the horizontal direction and 22 mm in the perpendicular direction, similarly to the antenna elements 120a to 120d of the first embodiment and the antenna elements 120e to 120g of the second embodiment. At this time, the distance between the centers of the antenna elements 1001, 1002, and 1004 to 1017, except for the antenna element 1003, in the horizontal direction is 18 mm.

On the other hand, the antenna element 1003 is disposed at a position where the distance between the centers of the antenna element 1003 and the adjacent antenna element 1002 in the horizontal direction differs from the distance between the centers of the other antenna elements. Specifically, for example, as shown in FIG. 11, the distance between the centers of the antenna element 1002 and the antenna element 1003 in the horizontal direction is 24.4 mm.

The antenna elements 1018 to 1020 are medium-distance reception antenna elements. For example, it is assumed that the size of the horn section 200 included in each of the antenna elements 1018 to 1020 is 9 mm in the horizontal direction and 33 mm in the perpendicular direction. That is, the antenna elements 1018 to 1020 has achieved a wider angle of antenna beams with respect to the horizontal direction by reducing the size of the horn section 200 in the horizontal direction as compared to the antenna elements 1001 to 1017 that are the long-distance reception antenna elements.

As shown in FIG. 11, the antenna elements 1018 and 1019 are disposed adjacent to each other in the horizontal direction. Therefore, the distance between the centers of the antenna element 1018 and the antenna element 1019 in the horizontal direction is 9 mm. On the other hand, the antenna element 1020 is disposed at a position shifted at an angle from the antenna elements 1018 and 1019, similarly to the antenna element 120g of FIG. 9 described in the second embodiment. That is, when viewed from the antenna elements 1018 and 1019, the antenna element 1020 is disposed at an angle from these antenna elements with respect to the arrangement direction thereof, that is, the horizontal direction. Thus, the distance between the centers of the antenna elements 1018 and 1019 in the horizontal direction differs from distances between the respective centers of these and the center of the antenna element 1020 in the horizontal direction. Specifically, for example, as shown in FIG. 11, the distance between the centers of the antenna element 1019 and the antenna element 1020 in the horizontal direction is 3.8 mm. At this time, the distance between the centers of the antenna element 1018 and the antenna element 1020 in the horizontal direction is 9.0−3.8=5.2 mm.

The antenna elements 1021 to 1023 are transmission antenna elements that transmit electromagnetic waves in the front direction, left direction, and right direction, respectively, in front of the vehicle. The antenna elements 1021 to 1023 transmit millimeter waves in the respective transmission directions by time division, for example.

In the present embodiment, the control unit 106 can detect the horizontal angle of the object in the same manner as described in the second embodiment by using the received signals for the three channels of the antenna elements 1001, 1002, and 1003. Specifically, the phase difference of the received signals is calculated by the phase monopulse method based on the distance between the centers of the antenna elements 1001 and 1002 in the horizontal direction illustrated in FIG. 11 and the received signals of these. Specifically, the phase difference of the received signals is calculated by the phase monopulse method based on the distance between the centers of the antenna elements 1002 and 1003 in the horizontal direction illustrated in FIG. 11 and the received signals of these. Then, the horizontal angle of the object is determined by angle matching processing based on the combination of the calculated phase difference of these.

Further, in the present embodiment, the control unit 106 can detect the horizontal angle of the object in the same manner as described in the second embodiment also by using the received signals for the three channels of the antenna elements 1018, 1019, and 1020. Specifically, the phase difference of the received signals is calculated by the phase monopulse method based on the distance between the centers of the antenna elements 1018 and 1019 in the horizontal direction illustrated in FIG. 11 and the received signals of these. Similarly, the phase difference of the received signals is calculated by the phase monopulse method based on the distance between the centers of the antenna elements 1018 and 1020 in the horizontal direction illustrated in FIG. 11 and the received signals of these. Then, the horizontal angle of the object is determined by angle matching processing based on the combination of the calculated phase difference of these.

Further, in the present embodiment, the control unit 106 can detect horizontal angles of a plurality of objects by the multiple signal classification (MUSIC) method by using the received signals of the antenna elements 1008 to 1017. Similarly, vertical angles of a plurality of objects can also be detected by the MUSIC method by using the received signals of the antenna elements 1001, 1002, 1004, 1005, 1006, 1007, 1008, 1009, 1013, and 1014.

According to the third embodiment of the present invention described above, it is possible to achieve a radar device that exerts the same effects as those described in the second embodiment and has three features of a long distance range, a wide viewing angle, and high angular resolution.

In each of the above embodiments, the example has been described where the transmission antenna 101 and the reception antenna 102 are configured using a plurality of horn antennas as antenna elements, but the present invention is not limited thereto. For example, array antennas or the like may be used for the transmission antenna 101 or the reception antenna 102.

Further, in the first embodiment, the example has been described where, in the reception antenna 102, two antenna elements are disposed side by side in each of the horizontal direction and the perpendicular direction, and one antenna element is disposed at an angle from the two antenna elements with respect to each of these directions, but the number of antenna elements is not limited thereto. That is, three or more antenna elements may be disposed side by side in the horizontal direction or the perpendicular direction. Further, two or more antenna elements may be arranged at an angle from the above antenna elements with respect to the horizontal direction or the perpendicular direction. Moreover, the antenna elements may be disposed side by side in a direction except for the horizontal direction and the perpendicular direction. The present invention is applicable when the reception antenna includes a first reception antenna element group made up of a plurality of first reception antenna elements that are disposed along a first direction; a second reception antenna element group made up of a plurality of second reception antenna elements that are disposed along a second direction perpendicular to the first direction, and a third reception antenna element that is disposed at an angle from at least two first reception antenna elements belonging to the first reception antenna element group with respect to the first direction and is disposed at an angle from at least two second reception antenna elements belonging to the second reception antenna element group with respect to the second direction, a distance between centers of the at least two first reception antenna elements in the first direction differs from distances between the respective centers of the at least two first reception antenna elements and a center of the third reception antenna element in the first direction, and a distance between centers of the at least two second reception antenna elements in the second direction differs from distances between the respective centers of the at least two second reception antenna elements and a center of the third reception antenna element in the second direction.

Further, in the second and third embodiments, the example has been described where, in the reception antenna 102, two antenna elements are disposed side by side in the horizontal direction, and one antenna element is disposed at an angle of the two antenna elements with respect to this direction, but the number of antenna elements is not limited thereto. That is, three or more antenna elements may be disposed side by side in the horizontal direction. Further, two or more antenna elements may be arranged at an angle from the above antenna elements with respect to the horizontal direction. Moreover, the antenna elements may be disposed side by side in a direction except for the horizontal direction. The present invention is applicable when the reception antenna includes: a first reception antenna element group made up of a plurality of first reception antenna elements that are disposed along a first direction; and a second reception antenna element that is disposed at an angle from at least two first reception antenna elements belonging to the first reception antenna element group with respect to the first direction, and a distance between centers of the at least two first reception antenna elements in the first direction differs from distances between the respective centers of the at least two first reception antenna elements and a center of the second reception antenna element in the first direction.

Each of the embodiments and the various modifications described above is merely an example, and the present invention is not limited to these contents so long as the features of the invention are not impaired. Moreover, although the various embodiment and modifications have been described above, the present invention is not limited to these contents. Other aspects conceivable within the scope of the technical idea of the present invention are also included in the scope of the present invention.

REFERENCE SIGNS LIST

100 radar device
101 transmission antenna
102 reception antenna
103 transmission unit
104 reception unit
105 oscillator
106 control unit
107 communication I/F unit
109 vehicle control device
110 FFT processing unit
112 object information calculation unit

The invention claimed is:

1. A radar device comprising:
a transmission antenna that transmits electromagnetic waves;
a reception antenna that receives reflected waves from an object reflecting the electromagnetic waves; and
a control unit,
wherein
the reception antenna includes
a first reception antenna element group made up of a plurality of first reception antenna elements that are disposed along a first direction, and
a second reception antenna element that is unevenly spaced from and disposed at an angle from at least two first reception antenna elements belonging to the first reception antenna element group with respect to the first direction,
a distance between centers of the at least two first reception antenna elements in the first direction differs from distances between the respective centers of the at least two first reception antenna elements and a center of the second reception antenna element in the first direction, and
the control unit performs signal processing to calculate an angle of the object in the first direction by using received signals from the at least two first reception antenna elements and a received signal from the second reception antenna element.

2. A radar device comprising:
a transmission antenna that transmits electromagnetic waves;
a reception antenna that receives reflected waves from an object reflecting the electromagnetic waves; and
a control unit, wherein the reception antenna includes a first reception antenna element group made up of a plurality of first reception antenna elements that are disposed along a first direction, a second reception antenna element group made up of a plurality of second reception antenna elements that are disposed along a second direction perpendicular to the first direction, and a third reception antenna element that is disposed unevenly spaced from and at an angle from at least two first reception antenna elements belonging to the first reception antenna element group with respect to the first direction and is disposed at an angle from at least two second reception antenna elements belonging to the second reception antenna element group with respect to the second direction, a distance between centers of the at least two first reception antenna elements in the first direction differs from distances between the respective centers of the at least two first reception antenna elements and a center of the third reception antenna element in the first direction, a distance between centers of the at least two second reception antenna elements in the second direction differs from distances between the respective centers of the at least two second reception antenna elements and a center of the third reception antenna element in the second direction, and the control unit performs signal processing to calculate an angle of the object in the first direction by using received signals from the at least two first reception antenna elements and a received signal from the third reception antenna element, and performs signal processing to calculate an angle of the object in the second direction by using received signals from the at least two second reception antenna elements and a received signal from the third reception antenna element.

3. The radar device according to claim 2, wherein one of the at least two first reception antenna elements and one of the at least two second reception antenna elements overlap each other.

4. The radar device according to claim 1, wherein the first direction is a horizontal direction or a perpendicular direction.

5. The radar device according to claim 1, wherein each of the first reception antenna element and the second reception antenna element includes a horn section, a dielectric lens that is disposed at one opening end of the horn section and collects the reflected waves, and an emitting section that is disposed at the other opening end of the horn section and converts the reflected waves, collected by the dielectric lens, into an electric signal.

6. The radar device according to claim 2, wherein each of the first reception antenna element, the second reception antenna element, and the third reception antenna element includes a horn section, a dielectric lens that is disposed at one opening end of the horn section and collects the reflected waves, and an emitting section that is disposed at the other opening end of the horn section and converts the reflected waves, collected by the dielectric lens, into an electric signal.

7. An antenna device to be used in a radar device, the antenna device comprising:

a first antenna element group made up of a plurality of first antenna elements that are disposed along a first direction; and a second antenna element that is disposed unevenly spaced from and at an angle from at least two first antenna elements belonging to the first antenna element group with respect to the first direction, and a distance between centers of the at least two first antenna elements in the first direction differs from distances between the respective centers of the at least two first antenna elements and a center of the second antenna element in the first direction.

8. An antenna device to be used in a radar device, the antenna device comprising:

a first antenna element group made up of a plurality of first antenna elements that are disposed along a first direction;

a second antenna element group made up of a plurality of second antenna elements that are disposed along a second direction perpendicular to the first direction; and a third antenna element that is disposed unevenly spaced from and at an angle from at least two first antenna elements belonging to the first antenna element group with respect to the first direction and is disposed at an angle from at least two second antenna elements belonging to the second antenna element group with respect to the second direction, wherein a distance between centers of the at least two first antenna elements in the first direction differs from distances between the respective centers of the at least two first antenna elements and a center of the third antenna element in the first direction, and a distance between centers of the at least two second antenna elements in the second direction differs from distances between the respective centers of the at least two second antenna elements and a center of the third antenna element in the second direction.

* * * * *